United States Patent
Shin et al.

(10) Patent No.: US 9,849,804 B2
(45) Date of Patent: Dec. 26, 2017

(54) METHOD AND SYSTEM FOR CONTROLLING BATTERY SOC OF HYBRID VEHICLE

(71) Applicant: Hyundai Motor Company, Seoul (KR)

(72) Inventors: Dong Jun Shin, Gyeonggi-do (KR); Ho Joong Lee, Gyeonggi-do (KR); Dong Su Ha, Gyeonggi-do (KR); Chang Ryeol Yoo, Incheon (KR); Jun Yeon Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 65 days.

(21) Appl. No.: 14/967,449

(22) Filed: Dec. 14, 2015

(65) Prior Publication Data

US 2017/0096078 A1 Apr. 6, 2017

(30) Foreign Application Priority Data

Oct. 2, 2015 (KR) .................. 10-2015-0138892

(51) Int. Cl.
*B60L 11/18* (2006.01)
*B60W 20/13* (2016.01)

(52) U.S. Cl.
CPC ....... *B60L 11/1868* (2013.01); *B60L 11/1862* (2013.01); *B60W 20/13* (2016.01); *B60L 2210/10* (2013.01); *B60L 2240/526* (2013.01); *B60L 2240/547* (2013.01); *B60L 2240/642* (2013.01); *B60L 2240/68* (2013.01); *B60W 2510/244* (2013.01); *B60W 2530/00* (2013.01); *B60W 2550/142* (2013.01);
(Continued)

(58) Field of Classification Search
CPC ............. B60L 11/1868; B60L 11/1862; B60L 2240/642; B60L 2240/547; B60L 2240/526; B60L 2210/10; B60W 20/13; B60W 2550/20; B60W 2550/142; B60W 2530/00; B60W 2510/244; B60Y 2200/92; Y10S 903/907
USPC ...................................... 701/1, 22
See application file for complete search history.

(56) References Cited

U.S. PATENT DOCUMENTS 6,166,517 A * 12/2000 Wakashiro ............. B60K 6/485
180/65.26
6,314,346 B1 * 11/2001 Kitajima ................ B60K 6/485
180/65.1
(Continued)

FOREIGN PATENT DOCUMENTS

JP 2012-524696 10/2012
KR 10-2009-0059175 A 6/2009
(Continued)

*Primary Examiner* — Jaime Figueroa
(74) *Attorney, Agent, or Firm* — Mintz Levin Cohn Ferris Glovsky and Popeo, P.C.; Peter F. Corless

(57) ABSTRACT

A method and system for controlling a battery SOC of a hybrid vehicle are provided to improve fuel efficiency in an urban area with a differentiated strategy for controlling auxiliary battery SOC balance of the hybrid vehicle. The method improves fuel efficiency in urban areas with a differentiated strategy of controlling SOC balance of an auxiliary battery considering that the degree of influence of electric field load consumption on fuel efficiency based on LDC voltage adjustment in the hybrid vehicle varies based on driving mode and road gradient.

16 Claims, 6 Drawing Sheets

(52) U.S. Cl.
CPC ... *B60W 2550/20* (2013.01); *B60W 2710/244* (2013.01); *B60Y 2200/92* (2013.01); *Y10S 903/907* (2013.01)

(56) References Cited

U.S. PATENT DOCUMENTS

| | | | | |
|---|---|---|---|---|
| 6,986,398 | B2* | 1/2006 | Obayashi | H02J 1/14 180/167 |
| 7,467,033 | B2* | 12/2008 | Miller | B60K 6/445 477/2 |
| 8,346,416 | B2* | 1/2013 | Liu | B60K 6/48 180/65.21 |
| 8,401,724 | B2* | 3/2013 | Goto | B60K 6/485 180/65.285 |
| 9,030,162 | B2* | 5/2015 | Andersson | B60K 6/46 320/109 |
| 9,517,765 | B2* | 12/2016 | Kato | B60L 11/123 |
| 2007/0124037 | A1* | 5/2007 | Moran | B60K 6/12 701/22 |
| 2012/0049792 | A1* | 3/2012 | Crombez | B60L 11/1862 320/109 |
| 2012/0187919 | A1* | 7/2012 | Andersson | B60K 6/46 320/138 |

FOREIGN PATENT DOCUMENTS

| | | |
|---|---|---|
| KR | 10-2010-0031964 A | 3/2010 |
| KR | 2011-0012214 A | 2/2011 |
| KR | 2012-0137153 A | 12/2012 |
| KR | 2013-0026765 A | 3/2013 |
| KR | 10-1439059 B1 | 11/2014 |
| KR | 10-1655665 B1 | 9/2016 |

* cited by examiner

METHOD AND SYSTEM FOR CONTROLLING BATTERY SOC OF HYBRID VEHICLE

CROSS-REFERENCE TO RELATED APPLICATION

This application claims under 35 U.S.C. §119(a) the benefit of priority to Korean Patent Application No. 10-2015-0138892 filed on Oct. 2, 2015, the entire contents of which are incorporated herein by reference.

BACKGROUND (a) Technical Field

The present invention relates to a method and system for controlling a battery state of charge (SOC) of a hybrid vehicle, and more particularly, to a method for controlling a battery SOC of a hybrid vehicle for improving fuel efficiency in an urban area with a differentiated strategy for controlling auxiliary battery SOC balance.

(b) Background Art

In general, a low-voltage direct current-direct current (DC-DC) converter (LDC) installed in a hybrid vehicle is configured to charge an auxiliary battery by converting a high DC voltage output from a main battery into a low DC voltage and to monitor the amount of electric field load of the vehicle to supply electricity to each electric field load based on the voltage used by each electric field load.

In an urban area where traffic is congested and the road slope frequently varies compared to a highway area, the average vehicle speed is very low (e.g., compared to an area with no traffic congestion), and LDC energy consumption is high. Accordingly, the influence of LDC energy consumption on the fuel efficiency is unfavorable. When the conventional control method is used to adjust the LDC output voltage in a driving situation with variable driving load due to conditions such as the average vehicle speed and the road gradient described above, fuel efficiency in urban areas is reduced. Accordingly, there is a need for improvement of fuel efficiency in urban areas using a differentiated control method.

The above information disclosed in this section is merely for enhancement of understanding of the background of the invention and therefore it may contain information that does not form the prior art that is already known in this country to a person of ordinary skill in the art.

SUMMARY

The present invention provides a method and system for controlling a battery SOC of a hybrid vehicle to improve fuel efficiency in urban areas with a differentiated strategy of controlling SOC balance of an auxiliary battery considering that the degree of influence of electric field load consumption on fuel efficiency according to LDC voltage control in the hybrid vehicle varies based on driving mode and road gradient.

In one aspect, the present invention provides a method for controlling a battery state of charge (SOC) of a hybrid vehicle that may include determining a driving load of the vehicle based on driving modes for respect speeds of the vehicle and inclination of the vehicle, determining a calibration value based on the driving load and a main battery SOC state, and adjusting an auxiliary battery SOC state by adjusting LDC output voltage for two driving load modes including a high load mode and a low load mode based on the calibration value.

In an exemplary embodiment, the determination of the driving load may include dividing speeds of the vehicle by stages from a low speed to a high speed based on an average speed, and determining the driving mode for each speed, dividing inclination of driving roads by stages and determining inclination of a road having the vehicle thereon, and dividing the driving load of the vehicle into high and low levels based on the determined driving mode and the determined inclination and determining the same, the levels being represented by relative numerical values.

In addition, the dividing of the speeds and determination of the driving mode may include dividing the speeds of the vehicle into six modes ranging from an extreme congestion mode to a high speed mode and determining the driving mode, and the dividing and determination of the inclination may include dividing the inclination into five stages ranging from a down ramp to a high up ramp and determining the inclination of the road.

In another exemplary embodiment, the determination of the calibration value may include determining the driving load of the vehicle and the main battery SOC state by classifying the driving load of the vehicle and the main battery SOC state into high and low levels represented by a plurality of relative numerical values and determining the calibration value is one of the relative numerical values based on the determined driving load and the determined main battery SOC state. In addition, the calibration value may be determined by a calibration value derivation table, wherein the calibration value may variably adjusted based on information on the driving load of the vehicle and the main battery SOC state.

Furthermore, the adjustment process may include determining, when the calibration value is equal to or greater than a predetermined reference value, that the driving load of the vehicle is in the high load mode and variably adjusting a low-voltage DC-DC converter (LDC) output voltage using an LDC output voltage instruction table dedicated to the high load mode to maintain the auxiliary battery SOC state at a high level.

Additionally, the adjustment process may include determining, when the calibration value is equal to or less than a predetermined reference value, that the driving load of the vehicle is in the low load mode, entering the low load mode and adjusting the auxiliary battery SOC state by dividing the low load mode into three regions. The three regions may include a discharge region, a weak discharge region, and a charge/discharge region. An auxiliary battery SOC value may then be compared with a transition threshold and whether transition of the auxiliary battery SOC state occurs may be determined. The transition threshold may be determined as a sum of the calibration value and a reference value, the reference value being set to a constant for transition of the auxiliary battery SOC state.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
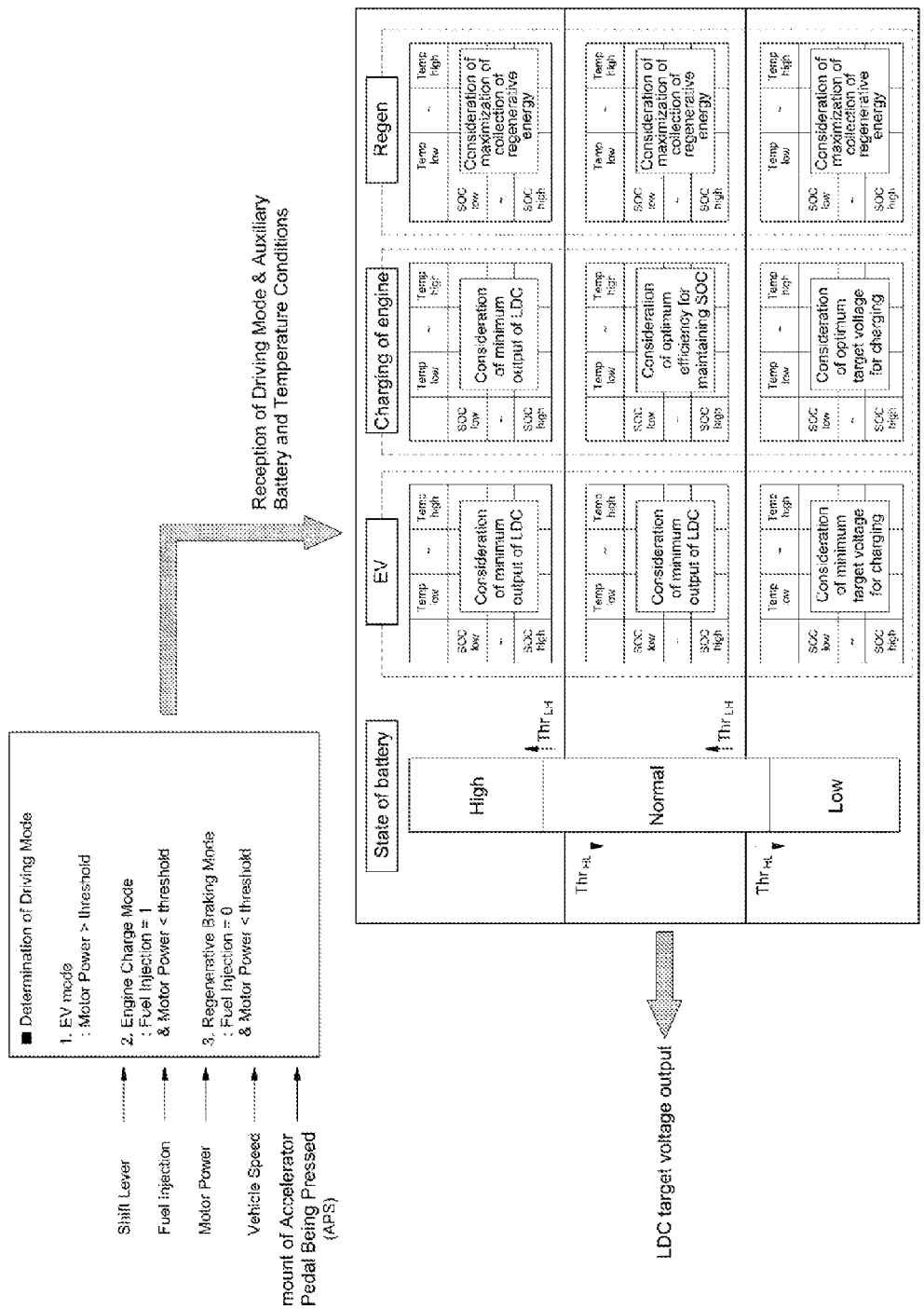
FIG. 1 illustrates a procedure of determining an output voltage of a conventional low-voltage DC-DC converter (LDC) according to the prior art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Conventionally, variable voltage control is performed using an efficient voltage control method for an LDC. Accordingly, the charge voltage or discharge voltage of the LDC is determined and output based on a distinguished driving mode. Since adjustment of the LDC charge voltage for charging an auxiliary battery is mainly performed when the vehicle travels in the regenerative braking mode, it is important to establish criteria for determining switching to and releasing the regenerative braking mode. The driving modes of the vehicle used for voltage control of the conventional LDC may be broadly divided into three modes including an engine charge mode, the regenerative braking mode, and an electric vehicle (EV) mode. A voltage control method for the conventional LDC will be described hereinafter.

FIG. 1 illustrates a procedure of determining an output voltage of a conventional LDC according to the prior art. In particular, voltage adjustment of the LDC is performed in a manner that a hybrid control unit (HCU) installed within a vehicle as a controller is configured to output a voltage instruction to the LDC.

First, as shown FIG. 1, the HCU is configured to determine a driving mode of the vehicle among the EV mode, the engine charge mode and the regenerative braking mode based on a shift lever, presence or absence of fuel injection, a vehicle speed, motor power and the engagement amount of an accelerator pedal (e.g., the amount of pressure being exerted onto the pedal). In addition, the HCU is configured to select an instruction table for an LDC voltage instruction based on the determined driving mode, received auxiliary battery SOC information and auxiliary battery temperature information, and determine and adjust the LDC output voltage (e.g., target voltage) based on the selected instruction table.

Specifically, the HCU is configured to select an instruction table for an LDC voltage instruction based on a driving mode and auxiliary battery SOC state information. The instruction table is constructed based on the auxiliary battery SOC and temperature information and stored in the HCU. Additionally, the instruction table is constructed based on the driving mode and auxiliary battery SOC and temperature information in consideration of a minimum LDC output, a minimum LDC target voltage for charging, optimum efficiency for maintenance of the battery SOC, an optimum LDC target voltage for charging, or maximization of restoration of regenerative braking energy.

For example, when the auxiliary battery SOC is high (e.g., greater than a predetermined level), minimum voltage output control of the LDC to minimize the charge rate of the auxiliary battery may be considered in the instruction table in the EV mode and engine charge mode. When the auxiliary battery SOC is low (e.g., less than a predetermined level), voltage control of the LDC for charging the auxiliary battery may be considered in the EV mode and engine charge mode, and LDC voltage control for maximizing restoration of energy may be considered in the regenerative braking mode. For the LDC output voltage control described above, the LDC may be configured to output a charge voltage for charging the auxiliary battery even when the auxiliary battery SOC is sufficient in the regenerative braking mode.

Figure 2:
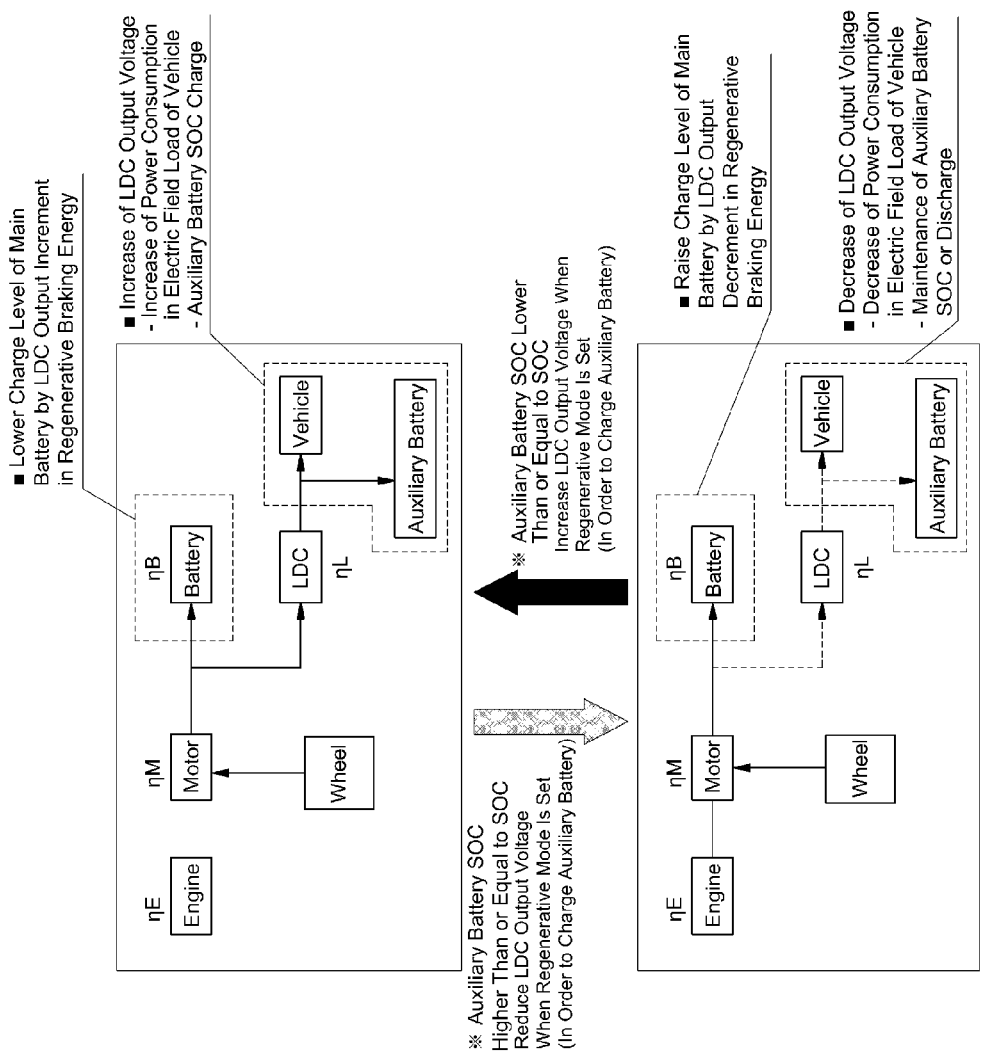
FIG. 2 illustrates flow of energy according to an LDC output for efficient control in a regenerative braking mode of a conventional hybrid vehicle according to the prior art.
Figure 3:
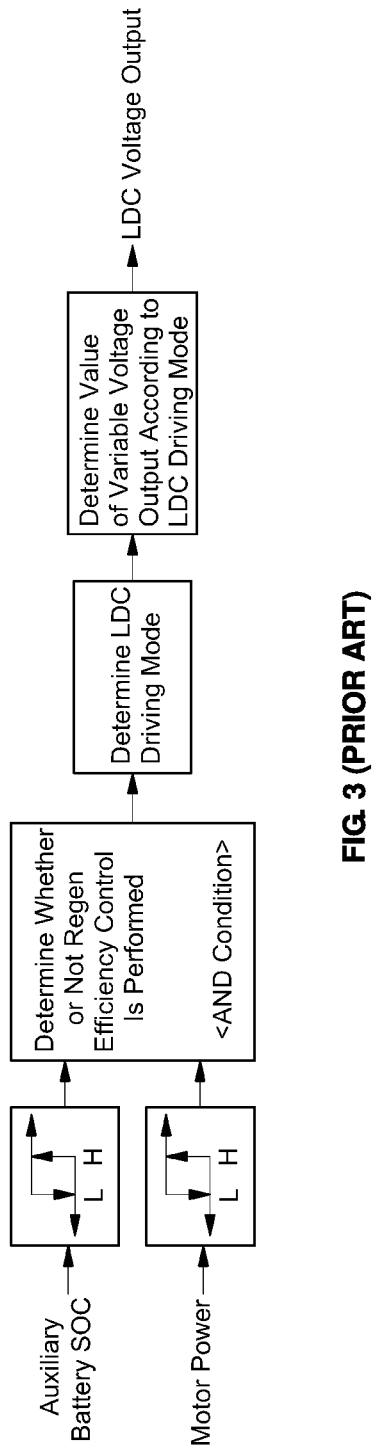
FIG. 3 illustrates a procedure of determining whether Regen efficiency control for efficient LDC output control is performed in the regenerative braking mode of the conventional hybrid vehicle according to the prior art.

FIG. 2 illustrates flow of energy according to an LDC output for efficient control in the regenerative braking mode of a conventional hybrid vehicle according to the prior art, and FIG. 3 illustrates a procedure of determining whether Regen efficiency control for efficient LDC output control is performed in the regenerative braking mode of the conventional hybrid vehicle according to the prior art.

As shown in FIG. 2, when the auxiliary battery SOC is sufficient, the auxiliary battery may not require charging. Accordingly, when the LDC output voltage is reduced, unnecessary charging of the auxiliary battery in the regenerative braking mode, which causes LDC output loss, may be prevented and, regenerative braking energy that corresponds to the LDC output loss caused by unnecessary LDC output (e.g., loss according to driving of electric field load of the vehicle and charging of the auxiliary battery) may be used to charge the main battery.

As shown in FIG. 3, performing Regen efficiency control for efficient LDC output control in the regenerative braking mode is determined based on the auxiliary battery SOC and the motor power, and the driving mode to be used for LDC output voltage control is determined. Accordingly, the LDC output voltage is adjusted by determining an LDC output value for variable voltage control based on the driving mode.

Moreover, a power consumption in an electric field load of the vehicle varies based on the adjustment of the LDC output voltage, and the degree of influence on the fuel efficiency based on the power consumption in the electric field load varies depending on the vehicle driving state (e.g., gradient, vehicle speed, deceleration, etc.). In other words, when the LDC output voltage is adjusted using the conventional variable voltage control method, power consumption in an electric field load varies based on the adjusted value of the LDC output voltage, and the degree of influence on the fuel efficiency according to power consumption in the electric field load varies based on the driving state of the vehicle.

When the conventional variable voltage control method, which does not take into account driving modes based on vehicle speed and gradient (or inclination level), is applied to adjust the LDC output voltage in an urban area where traffic congestion and slopes are more frequently encountered than on a highway, influence on the fuel efficiency based on the power consumption in the electric field load deteriorates, and thus fuel efficiency is degraded in the urban area. Accordingly, the present invention attempts to improve fuel efficiency in urban areas using a differentiated auxiliary battery SOC balance control strategy considering that influence of the power consumption in the electric field load based on the LDC voltage control (e.g., adjustment) of a hybrid vehicle on the fuel efficiency varies based on the driving mode for a vehicle speed and the gradient.

In particular, when the current LDC voltage control strategy is improved to enhance the major region of the auxiliary battery SOC being used (or auxiliary battery state) under the condition of middle/high-speed and high-load driving, fuel efficiency may be optimized when the vehicle traveling under driving conditions such as middle/high speed and high load, for example, on a highway enters an urban area.

Hereinafter, description will be given such that those skilled in the art may easily implement the present invention. The method described herein below may be understood to be executed by a controller having a processor and a memory. In particular, the present invention provides a method for optimizing auxiliary battery SOC balance resulting from variation of influence of electric field load power consumption on the fuel efficiency according to driving modes for respective speeds by adding a driving state of a vehicle to an input factor of conventional LDC voltage, which may enable improvement of fuel efficiency on an actual road. To consider driving modes for respective speeds as an input variable, an average vehicle speed may be calculated to classify driving modes for respective vehicle speeds ranging from an extreme congestion mode indicating a lowest average vehicle speed to a highest speed mode indicating a highest average vehicle speed.

Figure 5:
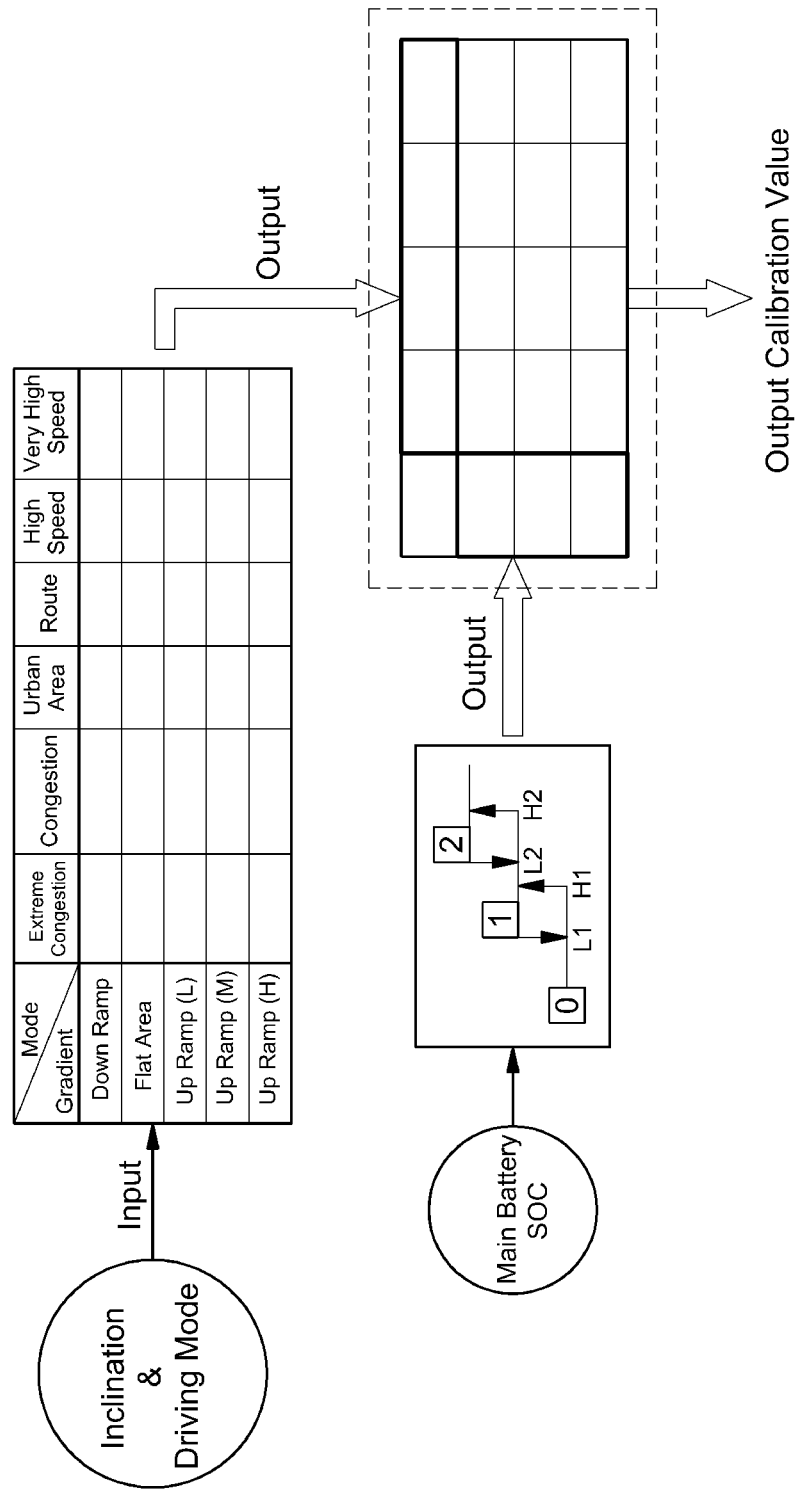
FIG. 5 illustrates change of an auxiliary battery SOC in relation to a method for controlling a battery SOC of a hybrid vehicle according to an exemplary embodiment of the present invention.

Specifically, referring to FIG. 5, the driving modes for respective vehicle speeds may be divided into six modes including an extreme congestion mode, a congestion mode, an urban area mode, a route mode, a high speed mode, and a highest speed mode. The driving modes may be divided based on the average vehicle speeds, and the average vehicle speed may gradually increase from the extreme congestion mode to the highest speed mode. For example, average vehicle speeds are equal to or less than 10 kph in the extreme congestion mode, 10 to 30 kph in the congestion mode, 30 to 60 kph in the urban area mode, 60 to 90 kph in the route mode, 90 to 120 kph in the high speed mode, and equal to or greater than 120 kph in the highest speed mode.]

The amount of electric field load power consumption increases stepwise from the extreme congestion mode to the highest speed mode. The modes may be divided into a high load mode and a low load mode based on the amount of electric field load power consumption. In particular, the modes from the extreme congestion mode to the urban area mode may be set to the low load mode, and the modes from the route mode to the highest speed mode may be set to the high load mode in terms of the amount of electric field load power consumption.

In addition, to consider a vehicle gradient as an input variable, inclination of the vehicle or the road slope may be classified based on a particular reference point (e.g., a starting point to calculate the inclination from) into stages ranging from a down ramp stage at which a lowest driving load may be applied to the vehicle to a high up ramp stage in which a highest driving load may be applied to the vehicle. Specifically, referring to FIG. 5, inclination of the vehicle may be divided into five stages including a down ramp stage, a flat area stage, a low up ramp stage, a middle up ramp stage, and a high up ramp stage. The respective stages may be divided based on the slope of the vehicle and the load of the vehicle gradually increases from the down ramp stage to the high up ramp stage.

Accordingly, a table for deriving a two-dimensional driving load level may be generated based on driving modes for respective average vehicle speeds and inclination of the vehicle. The table may be pre-created and stored in a memory of a vehicle controller. The vehicle controller may be configured to determine the driving mode for each vehicle speed and inclination of the vehicle as internal variables and determine a relative value output from the driving load level derivation table based on the detected values of the internal variables as a driving load level value.

A main battery SOC that indicates variation of the charging state based on variation of the LDC output voltage may be considered. The main battery SOC may be divided into three levels or states (0, 1, and 2), and shifting between the levels may be determined and implemented by hysteresis. An SOC equal to or less than a first threshold, which may be set relatively low, may be classified into level 0 (or Low), an SOC equal to or greater than a second threshold set to be greater than the first threshold may be classified into level 2 (or High), and an SOC, which is greater than the first threshold and less than the second threshold may be classified into level 1 (or Normal).

Figure 4:
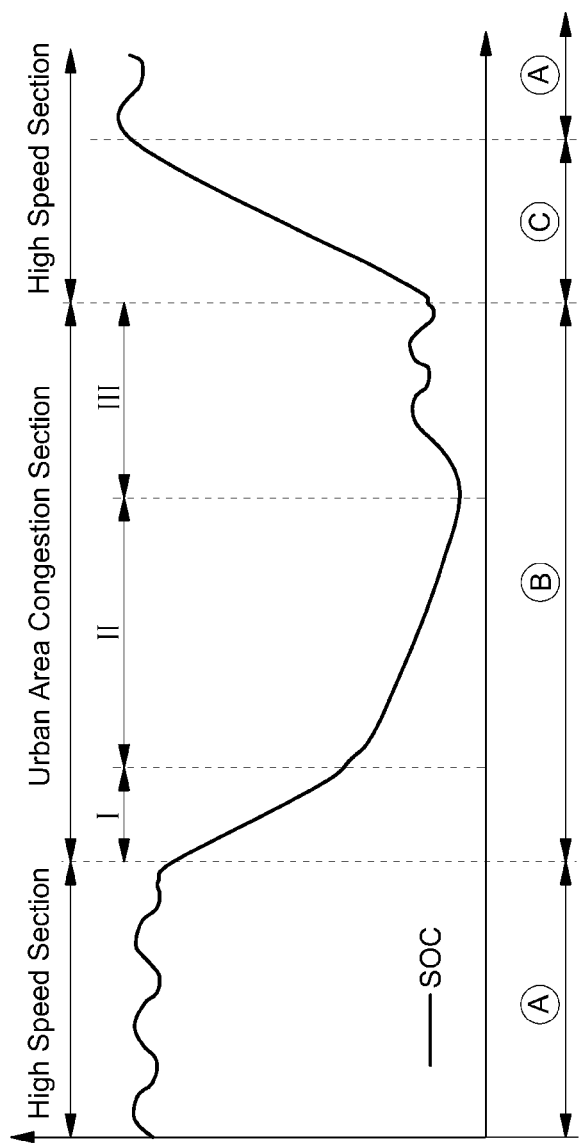
FIG. 4 illustrates a procedure of determining a calibration value in relation to a method for controlling a battery SOC of a hybrid vehicle according to an exemplary embodiment of the present invention.

A calibration value derivation table for determining a calibration value based on the driving load level and the main battery SOC state determined as above, namely a two-dimensional (2D) calibration value derivation table based on input of the driving load level information and the main battery SOC state information may be constructed and stored in the vehicle controller. Using the constructed calibration value derivation table, a calibration value reflecting the vehicle driving load state and the main battery SOC may be determined as a relative value, as shown in FIG. 4.

In addition, to differentiate control operation based on the input variables, the LDC output voltage may be adjusted based on the high driving load mode or the low driving load mode. Accordingly, the auxiliary battery SOC balance may be optimized. When driving is performed in the high load mode, the auxiliary battery SOC may be adjusted to increase and remain at a particular level. When driving is performed in the low load mode, the LDC output voltage may be adjusted to decrease from the raised level of the auxiliary battery SOC to decrease and maintain the auxiliary battery SOC level (or state). Accordingly, the electric field load power consumption may be reduced.

This power control strategy may be applied when the vehicle enters an urban area congestion section from a high speed drive section such as, for example, a highway, on which the vehicle travels in the high load mode, and travels in the low load mode, as illustrated in FIG. 5. When a calibration value determined based on the calibration value derivation table using the driving load level information and the main battery SOC state information as input variables is equal to or greater than a reference value established to determine that the driving load is in the high load mode, an LDC output voltage instruction table dedicated to the high load mode may be used to control the LDC output voltage.

The LDC output voltage instruction table dedicated to the high load mode, which is a 2D-type instruction table for determining an LDC output voltage based on input of the auxiliary battery SOC information and the auxiliary battery temperature information, may be generated to determine an LDC output voltage for maintenance of a high level of the auxiliary battery SOC. When the vehicle travels in the high load mode in a section such as the high speed section of FIG. 4 the LDC output voltage may be adjusted using the LDC output voltage instruction table dedicated to the high load mode. Accordingly, the auxiliary battery SOC may be maintained to be a high level, and thus the auxiliary battery SOC state may be maintained at the high level.

When the vehicle travels in the high load mode, the auxiliary battery SOC state may be maintained at the high level by repeating charge and discharge of the battery. When the vehicle traveling in the high load mode enters an urban area congestion section and travels in the low load mode, the auxiliary battery SOC state may be switched from the high level to the normal level and then the normal level may be maintained. Accordingly, the congestion section may be divided into a discharge region (section I of FIG. 4, a weak discharge region (section II of FIG. 4) and a charge/discharge region (section III of FIG. 4) to adjust the LDC output voltage.

When the vehicle switches to the low load mode and travels in the low load mode, the discharge region may be reached first. In the discharge region, the LDC output voltage is reduced compared to the output voltage for driving in the high load mode. Since only discharge is performed in the discharge region, the auxiliary battery SOC set to the high state during driving in the high load mode may be reduced along with the gradual discharge.

In the discharge region, the LDC output voltage may be adjusted to be maintained in a burst mode for guiding discharge of the auxiliary battery or to be maintained as a minimum voltage for driving electric field load. When the LDC output voltage is adjusted in the burst mode, the instruction voltage of the LDC may be adjusted to be less than the voltage (e.g., potential) of the auxiliary battery and the LDC output may be cut off. Accordingly, the auxiliary battery may be discharged.

Once the auxiliary battery SOC reduced in the discharge region reaches a transition threshold, the auxiliary battery SOC may enter the weak discharge region. To determine whether the auxiliary battery SOC enters the weak discharge region from the discharge region, that is, to determine transition of the auxiliary battery SOC state and transition conditions, the calibration value may be used.

In conventional cases, three auxiliary battery SOC states including low, normal, high have been determined as transition thresholds of set SOC values (constants). In contrast, in the present invention, sums of the set SOC values (e.g., constants) and the calibration value may be determined as transition thresholds. In other words, as the transition thresholds for determining whether an auxiliary battery SOC state is transitioned are set to values including the calibration value, the transition thresholds may be calibrated and determined as variables which are variably adjusted rather than as fixed constants. Accordingly, the regions of the high level and normal level of the auxiliary battery SOC state may be extended.

When the auxiliary battery SOC state is determined, based on transition thresholds calibrated by the calibration value, to enter the weak discharge region that corresponds to the normal level, the auxiliary battery SOC state may be limited by releasing Regen efficiency control. The Regen efficiency control is a control method for preventing the auxiliary battery from being charged and causing the main battery to be further charged by reducing the LDC output voltage when the vehicle enters the regenerative braking mode and charging the auxiliary battery is unnecessary as the auxiliary battery SOC is sufficient.

Conventional conditions for determining whether to perform and release the Regen efficiency control include the auxiliary battery SOC, the motor power, and the like. When the auxiliary battery SOC satisfies hysteresis, that is, the auxiliary battery SOC is equal to or less than a threshold set to determine that charging the auxiliary battery SOC is required, and the motor power satisfies the hysteresis, that is, the motor power is equal to or greater than a threshold set to determine that the motor power is in the deceleration state for generating regenerative braking energy, the conditions for performing the Regen efficiency are determined to be satisfied, and thus the LDC driving mode are determined to be set to the EV mode rather than transitioning to the regenerative braking mode. Accordingly, the LDC is configured to output a corresponding relatively low voltage.

In the present invention, sums of the conventional constants and the calibration value may be determined and used as thresholds for the auxiliary battery SOC for determining performing and release of Regen efficiency control. Accordingly, thresholds for the auxiliary battery SOC, which are one of the conditions for determining performing and release of Regen efficiency control, may be applied as variables that vary based on the calibration value.

As the calibration value is applied to calibrate the thresholds to determine whether Regen efficiency control is performed, power consumption in the electric field loads may be reduced through reduction of the LDC output voltage. In the weak discharge region, the condition for performing the Regen efficiency control, that is, the condition including the thresholds calibrated by the calibration value is not satisfied, and thus the performing may be limited.

In the charge/discharge region, the condition for performing the Regen efficiency control may be satisfied, and thus the LDC output voltage may be variably adjusted using the Regen efficiency control. Accordingly, when the auxiliary battery SOC is sufficient and thus charging is unnecessary, the LDC output voltage may be reduced. In the charge/discharge region, the auxiliary battery may be repeatedly charged and discharged to maintain the SOC at the normal level, and the conventional variable LDC output voltage control method is used to control the LDC output voltage, as shown in FIG. 5.

In other words, in the charge/discharge region, a value determined through the LDC output voltage instruction table generated based on the auxiliary battery SOC and auxiliary battery temperature information based on the LDC driving mode and the auxiliary battery SOC state may be determined as the LDC output voltage (see FIG. 2). When the vehicle switches from the low load mode back to the high load mode in the charge/discharge region (see section C of FIG. 5), a high level of LDC output voltage for auxiliary battery SOC charging may be adjusted to be output. Accordingly, the LDC output voltage instruction table dedicated to the high load mode may be applied to variably adjust the LDC output voltage.

Referring to section C of FIG. 5, the level of the auxiliary SOC gradually increases from the normal level up to the high level as charging is performed. After the auxiliary battery SOC reaches the high level (see section A of FIG. 5), the LDC output voltage may be adjusted to be an output value determined based on the LDC output voltage instruction table dedicated to the high load mode to maintain the SOC at the high level.

Figure 6:
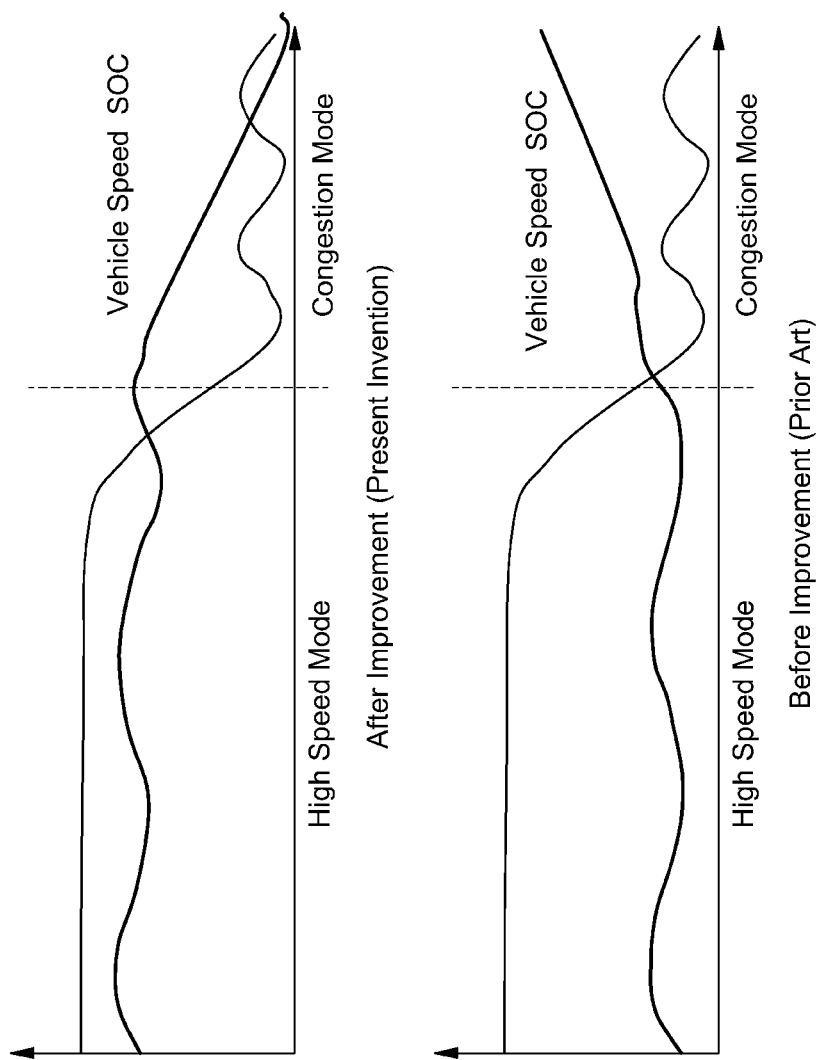
FIG. 6 illustrates comparison between the present invention and the conventional art.

FIG. 6 illustrates comparison between the auxiliary battery SOC control strategy of the present invention and the conventional art. As shown in the figure, when a vehicle traveling in the high speed mode (high load mode) enters the congestion mode (low load mode), fuel efficiency is reduced in urban areas in the congestion mode, wherein auxiliary battery SOC balance switches from the normal level to the high level to increase the LDC energy consumption and influence of the LDC energy consumption on the fuel efficiency, in conventional cases.

As further shown in FIG. 6, in the present invention, fuel efficiency in urban areas may be improved in the congestion mode, in which the auxiliary battery SOC balance switches from a high level to a low level, and thus LDC energy consumption may be reduced and influence thereof on fuel efficiency may be enhanced. In an urban area where a traffic jam frequently occurs, the auxiliary battery SOC may be switched to a low state to reduce the LDC energy consumption to lower electric field load power consumption. Accordingly, fuel efficiency may be improved.

As is apparent from the above description, the present invention provides the following effects.

Fuel efficiency in urban areas may be improved by differentiating an SOC balance control strategy for the auxiliary battery. Accordingly, fuel efficiency may be optimized when the vehicle traveling on a road such as a highway with high driving load at a high average speed enters an area such as an urban area with the average speed and driving load of the vehicle lowered. Additionally, improvement in fuel efficiency may lead to increase in commercial value of the vehicle.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method for controlling a battery state of charge (SOC) of a hybrid vehicle, comprising:
determining, by a controller, a driving load of the vehicle based on driving modes for respect speeds of the vehicle and an inclination of a driving road of the vehicle;
determining, by the controller, a calibration value based on the driving load and a main battery SOC state; and
adjusting, by the controller, an auxiliary battery SOC state according to two driving load modes based on the calibration value, the two driving load modes including a high load mode and a low load mode,
wherein the calibration value is determined by a calibration value derivation table, and the calibration value derivation table is generated with the calibration value variably adjusted based on information on the driving load of the vehicle and the main battery SOC state.

2. The method of claim 1, wherein the determination of the driving load includes:
dividing, by the controller, speeds of the vehicle, by stages, from a low speed to a high speed based on an average speed of the vehicle and determining the driving mode for each speed;
dividing, by the controller, the inclination of driving roads into a plurality of stages and determining the inclination of a road on which the vehicle is traveling; and
dividing, by the controller, the driving load of the vehicle into high and low levels based on the determined driving mode and the determined inclination.

3. The method of claim 2, wherein the dividing of the speeds and determining of the driving mode includes:
dividing, by the controller, the speeds of the vehicle into six modes ranging from an extreme congestion mode to a highest speed mode and determining the driving mode.

4. The method of claim 2, wherein the dividing and determining of the inclination includes:

dividing, by the controller, the inclination into five stages ranging from a down ramp to a high up ramp and determining the inclination of the road.

5. The method of claim 1, wherein the determination of the calibration value includes:
   determining, by the controller, the driving load of the vehicle and the main battery SOC state by classifying the driving load of the vehicle and the main battery SOC state into high and low levels; and
   determining, by the controller, the calibration value based on the determined driving load of the vehicle and the determined main battery SOC state.

6. The method of claim 1, wherein the adjustment of the auxiliary battery SOC state includes:
   determining, by the controller, when the calibration value is equal to or greater than a predetermined reference value, that the driving load of the vehicle is in the high load mode; and
   variably adjusting, by the controller, a low-voltage direct current-direct current (DC-DC) converter (LDC) output voltage using an LDC output voltage instruction table dedicated to the high load mode to maintain the auxiliary battery SOC state at a high level.

7. The method of claim 1, wherein the adjustment of the auxiliary battery SOC state includes:
   determining, by the controller, when the calibration value is equal to or less than a predetermined reference value, that the driving load of the vehicle is in the low load mode, entering the low load mode and adjusting the auxiliary battery SOC state by dividing the low load mode into three regions,
   wherein the three regions include a discharge region, a weak discharge region, and a charge/discharge region.

8. The method of claim 1, wherein the adjustment of the auxiliary battery SOC state includes:
   comparing, by the controller, an auxiliary battery SOC value with a transition threshold and determining whether transition of the auxiliary battery SOC state occurs,
   wherein the transition threshold is determined as a sum of the calibration value and a reference value, the reference value being set to a constant for transition of the auxiliary battery SOC state.

9. A system for controlling a battery state of charge (SOC) of a hybrid vehicle, comprising:
   a memory configured to store program instructions; and
   a processor configured to execute the program instructions, the program instructions when executed configured to:
     determine a driving load of the vehicle based on driving modes for respect speeds of the vehicle and an inclination of a driving road of the vehicle;
     determine a calibration value based on the driving load and a main battery SOC state; and
     adjust an auxiliary battery SOC state according to two driving load modes based on the calibration value, the two driving load modes including a high load mode and a low load mode,
   wherein the calibration value is determined by a calibration value derivation table, and the calibration value derivation table is generated with the calibration value variably adjusted based on information on the driving load of the vehicle and the main battery SOC state.

10. The system of claim 9, wherein the program instructions for the determination of the driving load when executed are further configured to:
    divide speeds of the vehicle, by stages, from a low speed to a high speed based on an average speed of the vehicle and determining the driving mode for each speed;
    divide the inclination of driving roads into a plurality of stages and determining the inclination of a road on which the vehicle is traveling; and
    divide the driving load of the vehicle into high and low levels based on the determined driving mode and the determined inclination.

11. The system of claim 10, wherein the program instructions when executed are further configured to:
    divide the speeds of the vehicle into six modes ranging from an extreme congestion mode to a highest speed mode and determining the driving mode.

12. The system of claim 10, wherein the program instructions when executed are further configured to:
    divide the inclination into five stages ranging from a down ramp to a high up ramp and determining the inclination of the road.

13. The system of claim 9, wherein the program instructions for the determination of the calibration value when executed are further configured to:
    determine the driving load of the vehicle and the main battery SOC state by classifying the driving load of the vehicle and the main battery SOC state into high and low levels; and
    determine the calibration value based on the determined driving load of the vehicle and the determined main battery SOC state.

14. The system of claim 9, wherein the program instructions for the adjustment of the auxiliary battery SOC state when executed are further configured to:
    determine when the calibration value is equal to or greater than a predetermined reference value, that the driving load of the vehicle is in the high load mode; and
    variably adjust a low-voltage direct current-direct current (DC-DC) converter (LDC) output voltage using an LDC output voltage instruction table dedicated to the high load mode to maintain the auxiliary battery SOC state at a high level.

15. The system of claim 9, wherein the program instructions for the adjustment of the auxiliary battery SOC state when executed are further configured to:
    determine when the calibration value is equal to or less than a predetermined reference value, that the driving load of the vehicle is in the low load mode, enter the low load mode and adjust the auxiliary battery SOC state by dividing the low load mode into three regions,
    wherein the three regions include a discharge region, a weak discharge region, and a charge/discharge region.

16. The system of claim 9, wherein the program instructions for the adjustment of the auxiliary battery SOC state when executed are further configured to:
    compare an auxiliary battery SOC value with a transition threshold and determining whether transition of the auxiliary battery SOC state occurs,
    wherein the transition threshold is determined as a sum of the calibration value and a reference value, the reference value being set to a constant for transition of the auxiliary battery SOC state.

* * * * *